United States Patent
Chaganti et al.

(10) Patent No.: US 10,747,522 B1
(45) Date of Patent: Aug. 18, 2020

(54) METHOD AND SYSTEM FOR NON-DISRUPTIVE HOST REPURPOSING

(71) Applicant: Dell Products L.P., Hopkinton, MA (US)

(72) Inventors: Ravikanth Chaganti, Bangalore (IN); Rizwan Ali, Cedar Park, TX (US); Dharmesh M. Patel, Round Rock, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/261,242

(22) Filed: Jan. 29, 2019

(51) Int. Cl.
| G06F 9/445 | (2018.01) |
| G06F 8/61 | (2018.01) |
| G06F 3/06 | (2006.01) |
| G06F 8/65 | (2018.01) |
| G06F 21/62 | (2013.01) |
| G06F 9/4401 | (2018.01) |
| G06F 21/78 | (2013.01) |
| G06F 21/44 | (2013.01) |

(52) U.S. Cl.
CPC ............. G06F 8/61 (2013.01); G06F 3/0604 (2013.01); G06F 3/0653 (2013.01); G06F 8/62 (2013.01); G06F 8/65 (2013.01); G06F 21/62 (2013.01); G06F 3/067 (2013.01); G06F 9/4401 (2013.01); G06F 21/44 (2013.01); G06F 21/78 (2013.01)

(58) Field of Classification Search
CPC .... G06F 3/0605; G06F 21/552; G06F 3/0653; G06F 8/61; G06F 8/65; G06F 9/4401; G06F 3/067; G06F 21/62; G06F 21/44
See application file for complete search history.

(56) References Cited

U.S. PATENT DOCUMENTS

| 7,987,353 B2 | 7/2011 | Holdaway et al. |
| 8,190,835 B1 | 5/2012 | Yueh |
| 8,364,917 B2 | 1/2013 | Bricker |
| 8,386,930 B2 | 2/2013 | Dillenberger et al. |
| 8,583,769 B1 | 11/2013 | Peters et al. |

(Continued)

OTHER PUBLICATIONS

"Make more time for the work that matters most", retrieved on-line Mar. 4, 2019 at https://asana.com/ (5 pages).

(Continued)

Primary Examiner — Tuan A Vu
(74) Attorney, Agent, or Firm — Chamberlain, Hrdlicka, White, Williams & Aughtry

(57) ABSTRACT

A method and system for non-disruptive host repurposing. Specifically, the method and system disclosed herein entail the re-optimization of datacenter hosts (e.g., servers) for any infrastructure and/or workload deployment. Different infrastructure and/or workload deployments may require the tuning of various memory parameters (or attributes) in the basic input-output system (BIOS) configuration. Presently, the repurposing of any given host demands the full reset of the system configuration—i.e., a disruptive process—prior to implementing the necessary BIOS configuration changes. In contrast, the method and system disclosed herein facilitate the repurposing of a host through the installation and/or uninstallation of configuration overlays—a modular approach to interchanging infrastructure and/or workload deployments—without the disruption of full system resets.

20 Claims, 12 Drawing Sheets

(56) References Cited

U.S. PATENT DOCUMENTS

| | | |
|---|---|---|
| 8,788,466 B2 | 7/2014 | Anglin |
| 8,868,987 B2 | 10/2014 | Wagner |
| 8,874,892 B1 | 10/2014 | Chan et al. |
| 8,898,114 B1 | 11/2014 | Feathergill et al. |
| 8,949,208 B1 | 2/2015 | Xu et al. |
| 9,122,501 B1 | 9/2015 | Hsu et al. |
| 9,201,751 B1 | 12/2015 | Muthirisavenugopal et al. |
| 9,278,481 B2 | 3/2016 | Hull |
| 9,355,036 B2 | 5/2016 | Beard et al. |
| 9,521,198 B1 | 12/2016 | Agarwala |
| 9,830,111 B1 | 11/2017 | Patiejunas et al. |
| 9,898,224 B1 | 2/2018 | Marshak et al. |
| 10,002,048 B2 | 6/2018 | Chennamsetty et al. |
| 10,031,672 B2 | 7/2018 | Wang et al. |
| 10,057,184 B1 | 8/2018 | Prahlad et al. |
| 10,091,295 B1 | 10/2018 | Savic |
| 10,097,620 B2 | 10/2018 | Reddy et al. |
| 10,339,455 B1 | 7/2019 | Parush-Tzur |
| 10,409,778 B1 | 9/2019 | Zhao |
| 2011/0099351 A1 | 4/2011 | Condict |
| 2011/0246597 A1* | 10/2011 | Swanson .............. G06F 3/0605 709/212 |
| 2013/0067459 A1* | 3/2013 | Sannidhanam ........... G06F 8/61 717/176 |
| 2013/0151683 A1 | 6/2013 | Jain |
| 2013/0339818 A1 | 12/2013 | Baker |
| 2014/0020083 A1* | 1/2014 | Fetik .................... G06F 21/552 726/11 |
| 2016/0062674 A1 | 3/2016 | Benight |
| 2017/0192868 A1 | 7/2017 | Vijayan |
| 2017/0206034 A1* | 7/2017 | Fetik .................... G06F 3/0653 |
| 2018/0307560 A1 | 10/2018 | Vishnumolakala |
| 2019/0379588 A1 | 12/2019 | Rao |

OTHER PUBLICATIONS

"Project Management Redefined", retrieved on-line Mar. 4, 2019 at https://www.robohead.net/features-2/ (2 pages).

"Features" Project Management Tools, retrieved on-line Mar. 4, 2019 at https://www.proworkflow.com/features-project-management-tools/ (7 pages).

* cited by examiner

Base Host Repurposing Package (HRP) – Example Package Manifest 240

Ⓐ Package ID 206
Ⓑ Base Flag 208
Ⓒ Package Description 210
Ⓓ Overlay Whitelist 212
Ⓔ Installation Workflow 214
Ⓕ Uninstallation Workflow 216

```
"name" : "S2D-Base-PM", Ⓐ
"isBasePM" : true, Ⓑ
"description" : "Microsoft Storage Spaces Direct Ready Solutions Base Manifest", Ⓒ
"overlays" : {
    "isAllowed" : true,
    "allowedlist" : [ Ⓓ
        "SQLRS",
        "VDIRS"
    ]
},
"install" : {
    "createRestore" : true, Ⓔ
    "configurationSet" : "S2DBaseManifest.json",
},
"uninstall" : {
    "recoverRestoreManifest" : true Ⓕ
}
```

FIG. 2B

Overlay Host Repurposing Package (HRP) – Example Package Manifest 242

```
{
  "name" : "SQLRS", (A)
  "isBasePM" : false, (B)
  "description" : "SQL Ready Solutions Overlay Manifest", (C)
  "overlays" : {
    "isAllowed" : false,
    "allowedList" : [ (D)
    ]
  },
  "install" : {
    "createRestore" : true, (E)
    "configurationSet" : "SQLManifest.json",
    "overrideOverlaps" : true
  },
  "uninstall" : {
    "recoverRestoreManifest" : true (F)
  }
}
```

(A) Package ID 206
(B) Base Flag 208
(C) Package Description 210
(D) Overlay Whitelist 212
(E) Installation Workflow 214
(F) Uninstallation Workflow 216

FIG. 2C

Base Host Repurposing Package (HRP) – Example Configuration Profile 244

① — ④ Attributes 220

Ⓐ Attribute ID 222

Ⓑ Attribute Value 224

Ⓒ Attribute Mode 226

```
 1  {
 2    "SystemConfiguration": {
 3      "Comments": [ ...
        ],
10      "Components": [
11        {
12          "FQDD": "BIOS.Setup.1-1",
13          "Attributes": [
14            {
15              "Name": "ModeInterleave",   Ⓐ
16              "Value": "Disabled",         Ⓑ
17              "Mode" : "ReadOnly"          Ⓒ
18            },                             ①
19            {
20              "Name": "LogicalProc",
21              "Value": "Enabled",
22              "Mode" : "ReadWrite"
23            },                             ②
24            {
25              "Name": "ProcVirtualization",
26              "Value": "Enabled",
27              "Mode" : "ReadOnly"
28            },                             ③
29            {
30              "Name": "WriteCache",
31              "Value": "Disabled",
32              "Mode" : "ReadWrite"
33            }                              ④
34          ]
35        }
36      ]
37    }
38  }
```

METHOD AND SYSTEM FOR NON-DISRUPTIVE HOST REPURPOSING

BACKGROUND

Different infrastructure and/or workload deployments for datacenter hosts (e.g., servers) may require the tuning of various memory parameters (or attributes) in the basic input-output system (BIOS) configuration. Presently, the repurposing of any given host demands the full reset of the system configuration—i.e., a disruptive process—prior to implementing the necessary BIOS configuration changes.

BRIEF DESCRIPTION OF DRAWINGS

FIG. 2B shows an exemplary package manifest for a base host repurposing package in accordance with one or more embodiments of the invention.

FIG. 2C shows an exemplary package manifest for an overlay host repurposing package in accordance with one or more embodiments of the invention.

FIG. 2D shows an exemplary configuration profile for a base host repurposing package in accordance with one or more embodiments of the invention.

DETAILED DESCRIPTION

Figure 1A:
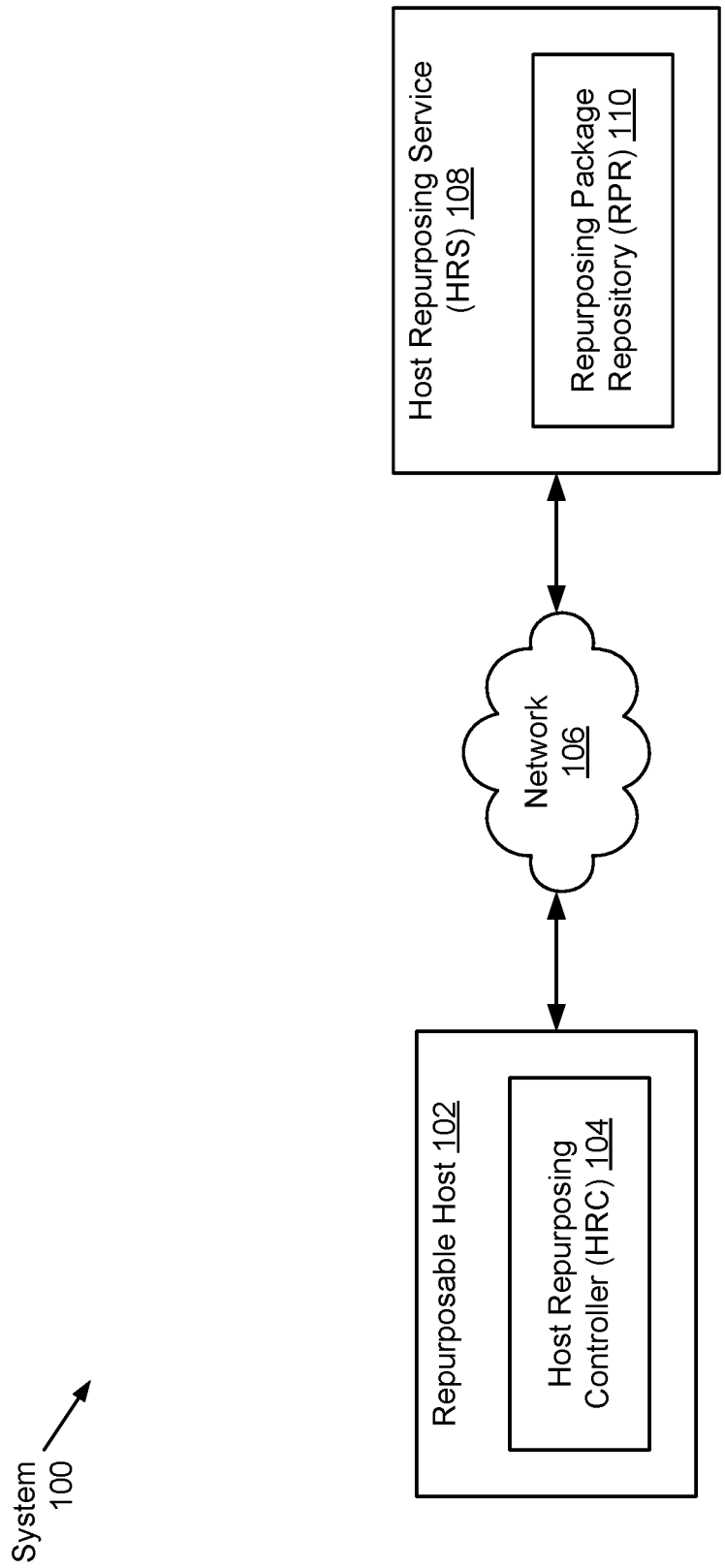
FIG. 1A shows a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-6, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Throughout the application, the phrase 'operatively connected' may be used to describe a connection between components. As used hereinafter, the aforementioned phrase may refer to any direct (e.g., wired directly between two or more components) or indirect (e.g., wired and/or wireless connections between any number of components connection the operatively connected components) connection.

In general, embodiments of the invention relate to a method and system for non-disruptive host repurposing. Specifically, one or more embodiments of the invention entail the re-optimization of datacenter hosts (e.g., servers) for any infrastructure and/or workload deployment. Different infrastructure and/or workload deployments may require the tuning of various memory parameters (or attributes) in the basic input-output system (BIOS) configuration. Presently, the repurposing of any given host demands the full reset of the system configuration—i.e., a disruptive process—prior to implementing the necessary BIOS configuration changes. In contrast, embodiments of the invention facilitate the repurposing of a host through the installation and/or uninstallation of configuration overlays—a modular approach to interchanging infrastructure and/or workload deployments—without the disruption of full system resets.

FIG. 1A shows a system in accordance with one or more embodiments of the invention. The system (100) may include a repurposable host (102) operatively connected to a host repurposing service (HRS) (108). Each of these components is described below.

In one embodiment of the invention, the repurposable host (102) and the HRS (108) may be directly or indirectly connected to one another through a network (106) (e.g., a local area network (LAN), a wide area network (WAN) such as the Internet, a mobile network, etc.). The network (106) may be implemented using any combination of wired and/or wireless connections. In embodiments in which the repurposable host (102) and the HRS (108) are indirectly connected, there may be other networking components or systems (e.g., switches, routers, gateways, etc.) that may facilitate communications, information exchange, and/or resource sharing. Further, the repurposable host (102) and the HRS (108) may communicate with one another using any combination of wired and/or wireless communication protocols.

In one embodiment of the invention, the repurposable host (102) may represent any physical computing system dedicated to managing datacenter resources (e.g., computing, memory, persistent and non-persistent storage, network bandwidth, etc.). These datacenter resources may be allocated towards supporting the deployment of specific workloads, for which the repurposable host (102) may be optimized. One of ordinary skill will appreciate that the repurposable host (102) may perform other functionalities without departing from the scope of the invention. Examples of the repurposable host (102) may include, but are not limited to, a bare-metal server, or any other computing system similar to the exemplary computing system shown in FIG. 6, which may be dedicated to specific workloads. Furthermore, the repurposable host (102) may include a host repurposing controller (HRC) (104)—e.g., a computer program executing thereon—which may be responsible for enabling and managing non-disruptive (e.g., reset-free) host repurposing. The HRC (104) is described in further detail below with respect to FIG. 1B.

In one embodiment of the invention, the HRS (108) may represent a support backend for the HRC (104). To that extent, the HRS (108) may include functionality to store and share various host repurposing packages (described below). Substantively, each host repurposing package may encompass the information and workflows necessary to non-disruptively repurpose the repurposable host (102). Further, the HRS (108) may be implemented on one or more servers (not shown). Each server may be a physical server (i.e., within a datacenter) or a virtual server (i.e., residing in a cloud computing environment). In one embodiment of the invention, the HRS (108) may be implemented on one or more computing systems similar to the exemplary computing system shown in FIG. 6.

In one embodiment of the invention, the HRS (108) may include a repurposing package repository (RPR) (110). The RPR (110) may represent data storage wherein various host repurposing packages (described below) may be consolidated. The RPR (110) may be implemented using one or more physical storage devices and/or media. The one or more physical storage devices and/or media may or may not be of the same type. Further, the various host repurposing packages consolidated in the RPR (110) may be arranged by way of any storage mechanism (e.g., a filesystem, a collection of tables or records, etc.). In one embodiment of the invention, the RPR (110) may be implemented using persistent (i.e., non-volatile) storage. Examples of persistent storage may include, but are not limited to: optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

While FIG. 1A shows a configuration of components, other system configurations may be used without departing from the scope of the invention. For example, in one embodiment of the invention, the system (100) may include additional repurposable hosts (not shown) operatively connected to the HRS (108). By way of another example, in another embodiment of the invention, the host repurposing service (HRS) (108) may be integrated or embedded into the repurposing host (102) rather than exist as or on a separate computing system.

Figure 1B:
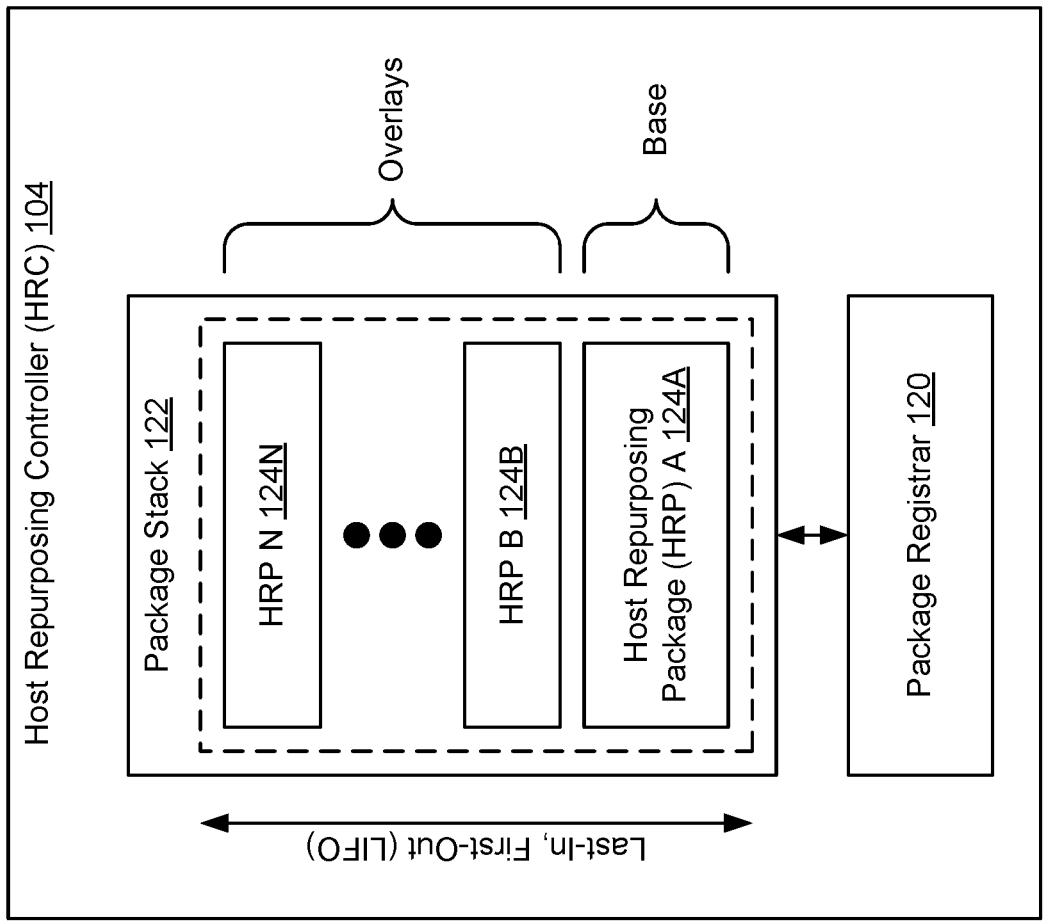
FIG. 1B shows a host repurposing controller in accordance with one or more embodiments of the invention.

FIG. 1B shows a host repurposing controller (HRC) in accordance with one or more embodiments of the invention. As mentioned above, the HRC (104) may represent a computer program, executing on the underlying hardware of the repurposable host (not shown), which may be responsible for enabling and managing non-disruptive (e.g., reset-free) host repurposing. To that extent, the HRC (104) may include a package stack (122) and a package registrar (120). Each of these subcomponents is described below.

In one embodiment of the invention, the package registrar (120) may represent a computer process (e.g., an instance of a computer program) tasked with implementing non-disruptive host repurposing and maintenance of the package stack (122). More specifically, the package registrar (120) may include functionality, in accordance with embodiments of the invention, to: process new host repurposing packages (HRPs) (124A-124N) (see e.g., FIGS. 3A and 3B); and, in doing so, install the new HRPs (124A-124N) (see e.g., FIG. 4) and/or uninstall already-installed HRPs (124A-124N) (see e.g., FIG. 5). One of ordinary skill will appreciate that the package registrar (120) may perform other functionalities without departing from the scope of the invention.

In one embodiment of the invention, the package stack (122) may represent an in-memory data structure used to track a sequential collection of HRPs (124A-124N), which have been installed on the repurposable host (not shown). HRPs (124A-124N) may be stored (i.e., installed) and removed (i.e., uninstalled) according to a last-in, first-out (LIFO) ordering scheme. Further, each HRP (124A-124N) may encompass respective system (e.g., basic input-output system (BIOS)) configuration changes, which when applied, re-optimizes the repurposable host for a different infrastructure and/or workload deployment. Moreover, the first HRP (e.g., HRP A (124A)) stored in the package stack (122) may also be referred herein as a base HRP, whereas any subsequent HRP (e.g., HRP B-N(124B-124N)) stored in the package stack (122) thereafter may each also be referred herein as an overlay HRP.

In one embodiment of the invention, a base HRP (e.g., HRP A (124A)) may represent a foundation system configuration set that may be common across various infrastructure and/or workload deployments. Further, a base HRP may adjust (or override) at least a subset of the configuration settings (e.g., parameters or attributes) established in a factory-provisioned (or default) system configuration. On the other hand, an overlay HRP (e.g., HRP B-N(124B-124N)) may represent an optimal system configuration set that may be specialized for a particular infrastructure and/or workload deployment. Moreover, an overlay HRP may adjust (or override) at least a subset of the configuration settings (e.g., parameters or attributes) established in an installed base HRP and/or one or more previously installed overlay HRPs, if any. HRPs (124A-124N) are described in further detail below with respect to FIG. 2A.

Figure 2A:
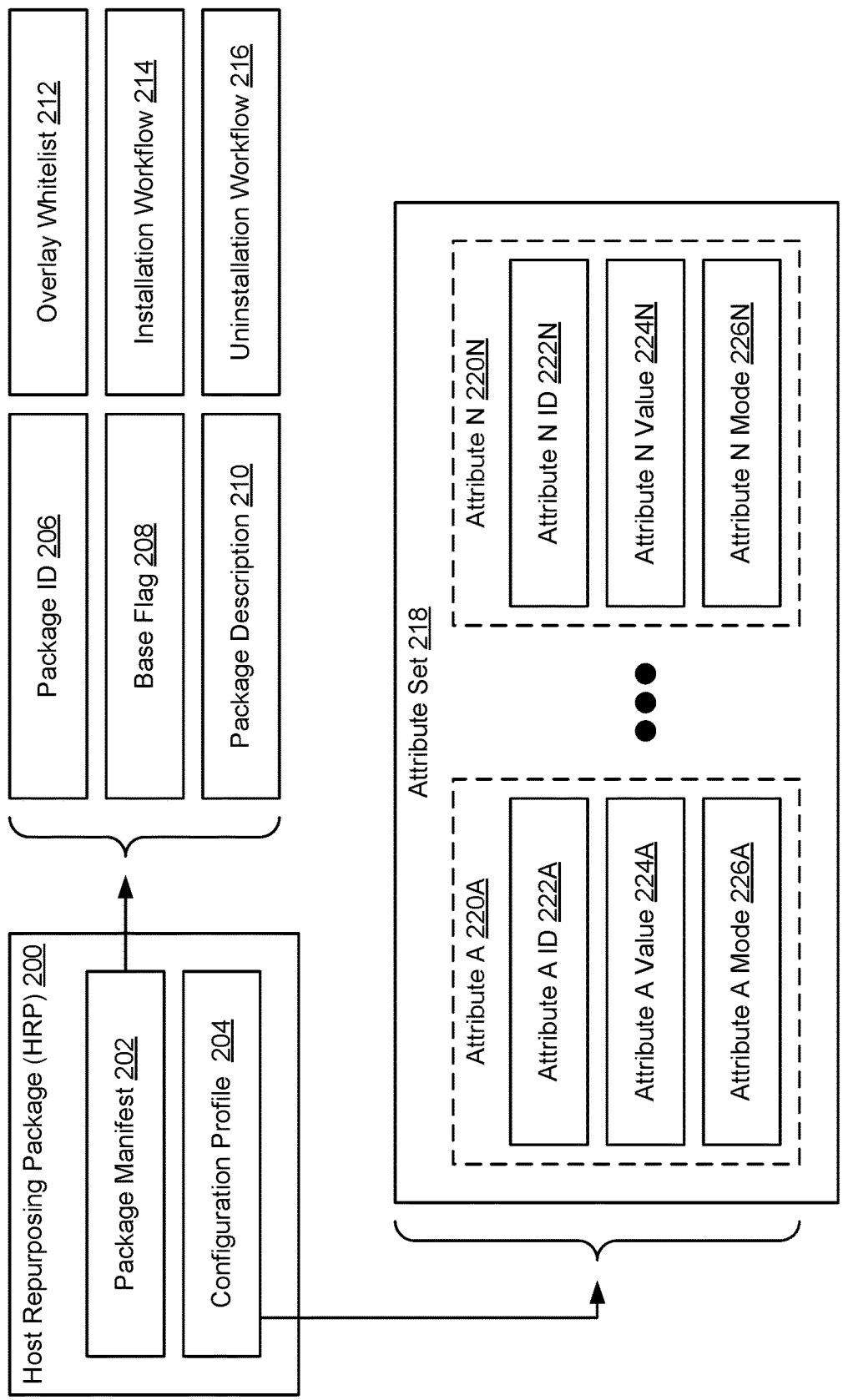
FIG. 2A shows a host repurposing package in accordance with one or more embodiments of the invention.

FIG. 2A shows a host repurposing package (HRP) in accordance with one or more embodiments of the invention. The HRP (200) may represent an archive and/or compressed file format—e.g., a RAR formatted file, a ZIP formatted file, a tape archive (TAR) formatted file, or any other file format that supports archiving and/or compression. Further, the content, archived and/or compressed within the HRP (200), may include a package manifest (202) and a configuration profile (204). Each of these components is described below.

In one embodiment of the invention, the package manifest (202) may represent a script of instructions, or computer readable program code, which may be interpreted by the package registrar (see e.g., FIG. 1B). Substantively, the package manifest (202) may direct the package registrar in processing the HRP (200) and, accordingly, may include, but is not limited to disclosing: a package identifier (ID) (206), a base flag (208), a package description (210), an overlay whitelist (212), an installation workflow (214), and an uninstallation workflow (216). Each of these subcomponents is described below. Further, examples of a package manifest (202) are shown in FIGS. 2B and 2C.

In one embodiment of the invention, the package ID (206) may refer to a string of characters (e.g., letters, numbers, symbols, or any combination thereof) that may uniquely identify the HRP (200). Further, the package ID (206) may extend any arbitrary length. By way of examples, the package ID (206) may be represented through an alphanumeric string (e.g., "packageId01") or a N-bit integer (where N>0) expressed in hexadecimal notation (e.g., "7A22BC").

In one embodiment of the invention, the base flag (208) may represent a variable or a value that reflects a package type associated with the HRP (200). The package type of any given HRP (200) may include: (a) a base package type (also referred herein as a base HRP), which may reference a foundation system configuration set that may be common across various infrastructure and/or workload deployments; or (b) an overlay package type (also referred herein as an overlay HRP), which may alternatively reference an optimal system configuration set that may be specialized for a particular infrastructure and/or workload deployment. Accordingly, the base flag (208) may be implemented using binary (i.e., logical one or logical zero) or Boolean (i.e., true or false) values.

In one embodiment of the invention, the package description (210) may refer to a string of characters (e.g., letters, numbers, symbols, or any combination thereof) that may concisely describe the common or specific infrastructure and/or workload deployment with which the HRP (200) may be associated. Further, the package description (210) may extend any arbitrary length. By way of an example, the package description (210) may be represented through an alphanumeric string (e.g., "SQL Workload Base Manifest").

In one embodiment of the invention, the overlay whitelist (212) may represent a list of overlay HRP permissions. Specifically, the overlay whitelist (212) may specify zero or more package IDs (206) representative of other HRPs (not shown), which may be installed over the HRP (200). Further, the overlay whitelist (212) may present an empty set when no other (or zero) HRPs may be overlaid on top of the HRP (200).

In one embodiment of the invention, the installation workflow (214) may refer to a sequence of properties, which collectively outline the process for installing the HRP (200) on a repurposable host. Specifically, the installation workflow (214) may identify one or more tuples in a sequenced order, where each tuple may include an installation-pertinent parameter and a corresponding parameter value associated with the installation-pertinent parameter. The package registrar (see e.g., FIG. 1B) may interpret these one or more sequenced tuple(s) to properly install the HRP (200). By way of examples, the installation workflow (214) may specify tuples that may direct the package registrar to create a restore profile (described below), identify and access the configuration profile (204), and override overlapping system configuration attributes (described below) adjusted by the HRP (200) and any one or more other HRPs (not shown).

In one embodiment of the invention, the uninstallation workflow (216) may refer to a sequence of properties, which collectively outline the process for uninstalling the HRP (200) from a repurposable host. Specifically, the uninstallation workflow (216) may identify one or more tuples in a sequenced order, where each tuple may include an uninstallation-pertinent parameter and a corresponding parameter value associated with the uninstallation-pertinent parameter. The package registrar (see e.g., FIG. 1B) may interpret these one or more sequenced tuple(s) to properly uninstall the HRP (200). By way of an example, the uninstallation workflow (216) may specify a tuple that may direct the package registrar to revert a state of the repurposable host to a prior system configuration using a restore profile (described below), which may have been created during the installation process of the HRP (200).

Figure 2E:
FIG. 2E shows an exemplary configuration profile for an overlay host repurposing package in accordance with one or more embodiments of the invention.

In one embodiment of the invention, the configuration profile (204) may refer to an outline of system (e.g., basic input-output system (BIOS)) configuration changes, which when applied, re-optimizes a repurposable host for a respective infrastructure and/or workload deployment. To that end, the configuration profile (204) may specify an attribute set (218) including one or more system configuration settings (or attributes) (220A-220N). Each system configuration attribute (220A-220N) may be further defined through an attribute identifier (ID) (222A-222N), an attribute value (224A-224N), and an attribute mode (226A-226N). Each of these properties is described below. Further, examples of a configuration profile (204) are shown in FIGS. 2D and 2E.

In one embodiment of the invention, an attribute ID (222A-222N) may refer to a string of characters (e.g., letters, numbers, symbols, etc.) that may uniquely identify a respective system configuration attribute (220A-220N). Further, an attribute ID (222A-222N) may extend any arbitrary length. By way of an example, an attribute ID (222A-222N) may be represented through an alphanumeric string (e.g., "Attribute-04").

In one embodiment of the invention, an attribute value (224A-224N) may refer to a new value to be associated with the system configuration attribute (220A-220N). That is, an attribute value (224A-224N) may represent a new value, adjusted for implementing a particular infrastructure and/or workload deployment, which is to replace a current (or existing) value for the system configuration attribute (220A-220N) exhibited on the repurposable host (not shown). Further, an attribute value (224A-224N) may disclose a new value compatible with a data type of the respective system configuration attribute (220A-220N)—e.g., a string of characters (e.g., letters, numbers, symbols, or any combination thereof), a number (e.g., integers, decimals, etc.), a Boolean (e.g., true or false), or any value within a range of values associated with any other data type.

In one embodiment of the invention, an attribute mode (226A-226N) may refer to a permission that reflects whether new attribute value (224A-224N) for the system configuration attribute (220A-220N) can be overridden by a future new attribute value (not shown) specified in the configuration profile of any future HRP yet to be installed after the HRP (200). That is, an attribute mode (226A-226N) may indicate that, should a future HRP call for the adjustment of the respective system configuration attribute (220A-220N), the package registrar may either: (a) allow the future adjustment; or (b) deny the future adjustment. Accordingly, an attribute mode (226A-226N) may be implemented using binary values (i.e., logical one or logical zero), Boolean (i.e., true or false) values, or any other two opposing values (e.g., "ReadWrite" indicative of allowance or "ReadOnly" indicative of rejection).

FIG. 2B shows an exemplary package manifest for a base host repurposing package (HRP) in accordance with one or more embodiments of the invention. The example base HRP package manifest (240) presents a script that specifies: (A) a package ID (206) uniquely identifying the base HRP—i.e., "S2D-Base-PM"; (B) a base flag (208) indicating that the base HRP is indeed a base HRP—i.e., "true"; (C) a package description (210) concisely describing the associated infrastructure and/or workload deployment—i.e., "Microsoft Storage Spaces Direct Ready Solutions Base Manifest"; (D) an overlay whitelist (212) including package IDs for two other HRPs which are allowed to be installed (or overlaid) on top of the base HRP—i.e., "SQLRS" and "VDIRS"; (E) an installation workflow (214) instructing the generation of a restore profile—i.e., "createRestore": true—and an identifier pertaining to the associated configuration profile (204)—i.e., "S2DBaseManifest.json" (expressed in a JavaScript Object Notation (JSON) formatted file); and (F) an uninstallation workflow (216) instructing the recovery of a previous system configuration—i.e., "recoverRestoreManifest": true—using the restore profile generated in the installation workflow (214).

FIG. 2C shows an exemplary package manifest for an overlay host repurposing package (HRP) in accordance with one or more embodiments of the invention. The example overlay HRP package manifest (242) presents a script that specifies: (A) a package ID (206) uniquely identifying the overlay HRP—i.e., "SQLRS"; (B) a base flag (208) indicating that the overlay HRP is not a base HRP—i.e., "false"; (C) a package description (210) concisely describing the associated infrastructure and/or workload deployment—i.e., "SQL Workload Overlay Manifest"; (D) an overlay whitelist (212) reflecting an empty set; (E) an installation workflow (214) instructing the generation of a restore profile—i.e., "createRestore": true—an identifier pertaining to the associated configuration profile (204)—i.e., "SQLManifest.json" (expressed in a JavaScript Object Notation (JSON) formatted file), and an attribute overriding permission—i.e., "overrideOverlaps": true—thus allowing any new attribute value(s), specified in the associated configuration profile (204), to override respective current attribute value(s) that had been set by an installed base HRP; and (F) an uninstallation workflow (216) instructing the recovery of a previous system configuration—i.e., "recoverRestoreManifest": true—using the restore profile generated in the installation workflow (214).

FIG. 2D shows an exemplary configuration profile for a base host repurposing package (HRP) in accordance with one or more embodiments of the invention. The example base HRP configuration profile (244) presents a script that specifies: (1)-(4) definitions for four attributes (220), where each attribute definition includes: (A) an attribute ID (222) uniquely identifying the attribute (220)—e.g., "NodeInterleave"; (B) an attribute value (224) assigning a new value for the attribute (220)—e.g., "Disabled"; and (C) an attribute mode (226) indicating that the attribute (220) may not be overridden by a future HRP installment—e.g., "ReadOnly".

FIG. 2E shows an exemplary configuration profile for an overlay host repurposing package (HRP) in accordance with one or more embodiments of the invention. The example overlay HRP configuration profile (246) presents a script that specifies: (1)-(3) definitions for three attributes (220), where each attribute definition includes: (A) an attribute ID (222) uniquely identifying the attribute (220)—e.g., "LogicalProc"; (B) an attribute value (224) assigning a new value for the attribute (220)—e.g., "Disabled"; and (C) an attribute mode (226) indicating that the attribute (220) may be overridden by a future HRP installment—e.g., "ReadWrite".

Figure 3A:
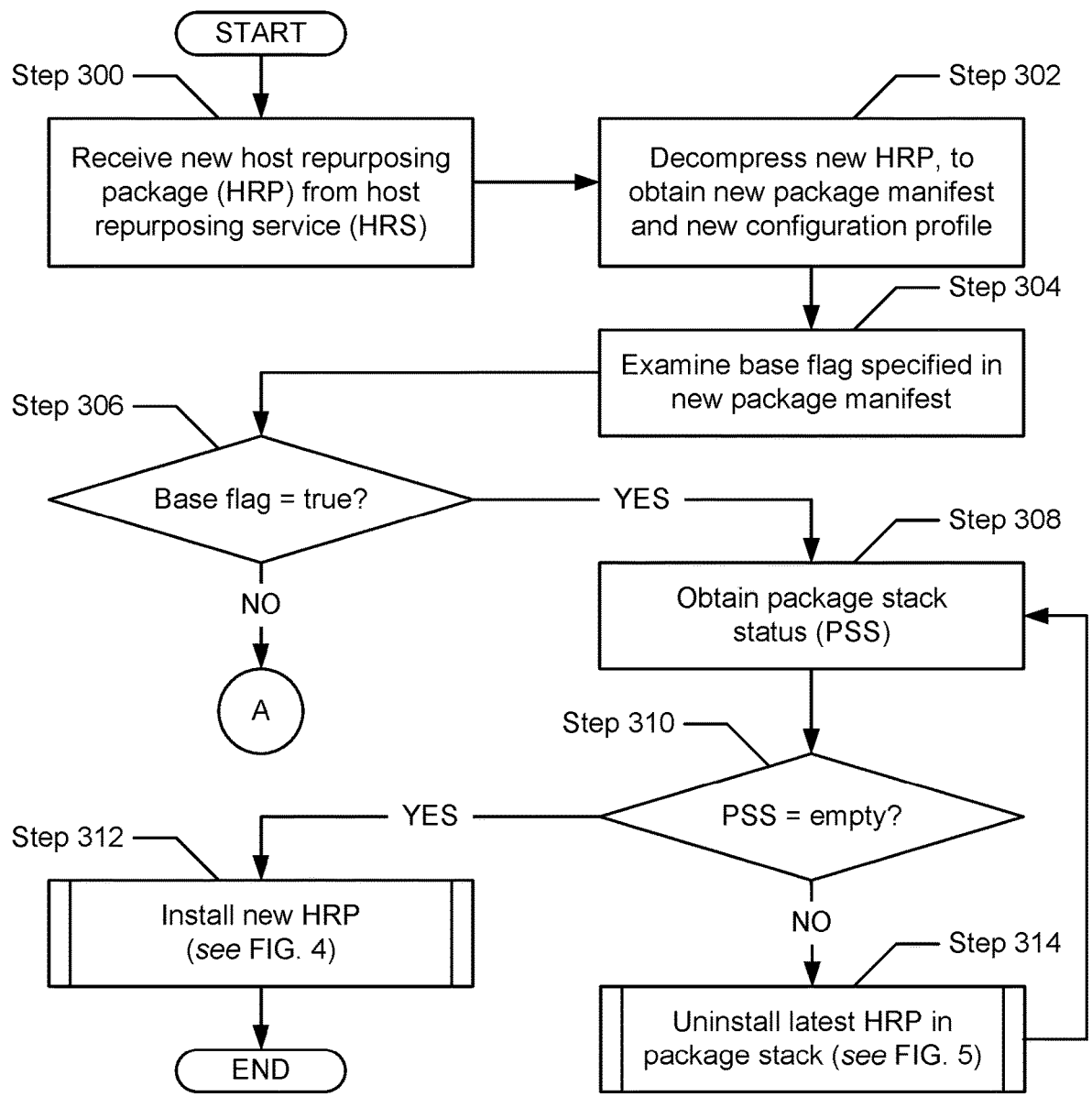
FIGS. 3A and 3B show flowcharts describing a method for processing a new host repurposing package in accordance with one or more embodiments of the invention.
Figure 3B:
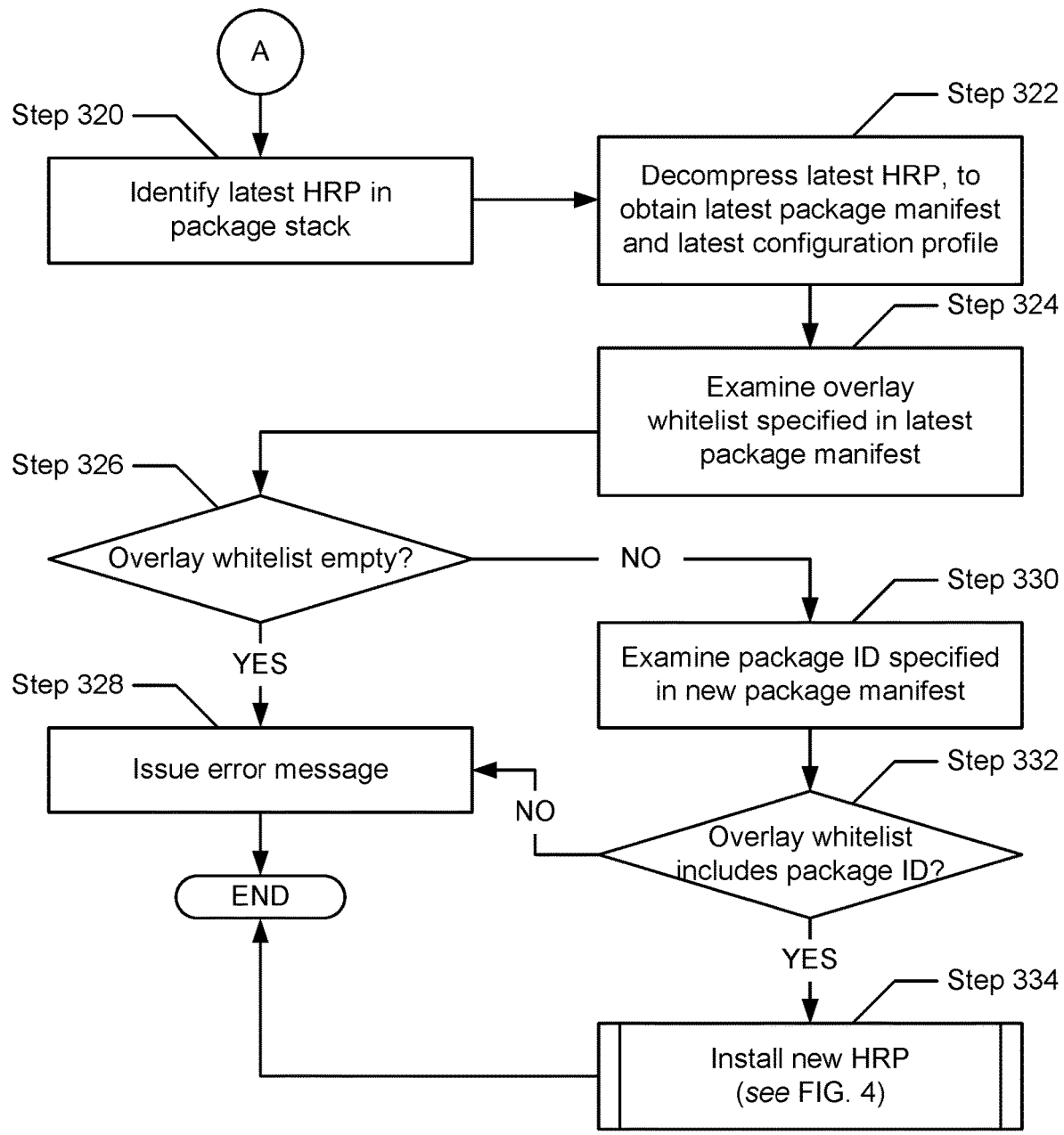

FIGS. 3A and 3B show flowcharts describing a method for processing a new host repurposing package (HRP) in accordance with one or more embodiments of the invention. The various steps outlined below may be performed by the package registrar of the host repurposing controller (HRC) on the repurposable host (see e.g., FIGS. 1A and 1B). Further, while the various steps in the flowcharts are presented and described sequentially, one of ordinary skill will appreciate that some or all steps may be executed in different orders, may be combined or omitted, and some or all steps may be executed in parallel.

Turning to FIG. 3A, in Step 300, a new HRP is received from the host repurposing service (HRS) (see e.g., FIG. 1A). In one embodiment of the invention, the new HRP reference a collection of system configuration changes, which implement, and thus optimize the repurposable host for, a particular infrastructure and/or workload deployment. Further, the new HRP may have been received in response to an earlier submitted query to the HRS, which may have requested the new HRP.

In Step 302, the new HRP (received in Step 300) is decompressed. In one embodiment of the invention, any HRP (including the new HRP) may take form as an archive and/or compressed file format, which may enclose some content. Through decompression of the new HRP, the exposed content, which may be obtained, may include a new package manifest and a new configuration profile. Both of these items are described in detail above with respect to FIG. 2A.

In Step 304, a base flag specified in the new package manifest (obtained in Step 302) is examined. In one embodiment of the invention, the base flag may represent a variable or a value that reflects a package type associated with the new HRP (received in Step 300). The package type of any given HRP may include: (a) a base package type (also referred herein as a base HRP), which may reference a foundation system configuration set that may be common across various infrastructure and/or workload deployments; or (b) an overlay package type (also referred herein as an overlay HRP), which may alternatively reference an optimal system configuration set that may be specialized for a particular infrastructure and/or workload deployment. Further, the base flag may be implemented using binary (i.e., logical one or logical zero) or Boolean (i.e., true or false) values.

In Step 306, a determination is made as to whether the base flag (examined in Step 304) reflects that the new HRP (received in Step 300) is representative of a base HRP (described above). In one embodiment of the invention, if it is determined that the new HRP is a base HRP (e.g., base flag=true), then the process may proceed to Step 308. On the other hand, in another embodiment of the invention, if it is alternatively determined that the new HRP is not a base HRP, but rather an overlay HRP (described above) (e.g., base flag=false), then the process may alternatively proceed to Step 320 (see e.g., FIG. 3B).

In Step 308, after determining (in Step 306) that the base flag (examined in Step 304) reflects that the new HRP (received in Step 300) is a base HRP, a package stack status (PSS) is obtained. In one embodiment of the invention, the PSS may refer to a dynamic variable or value that reflects a current state of the package stack (see e.g., FIG. 1B). The package stack may represent an in-memory data structure used to track a sequential collection of HRPs, which have already been installed on the repurposable host. Further, the current state of the package stack may include, but is not limited to: (a) an empty state, which may reflect that zero HRPs have already been installed on the repurposable host; or (b) a non-empty state, which may alternatively reflect that at least one HRP has already been installed on the repurposable host.

In Step 310, a determination is made as to whether the PSS (obtained in Step 308) reflects that the package stack is currently empty. In one embodiment of the invention, if it is determined that a current state of the package stack references the empty state (described above), then the process may proceed to Step 312. On the other hand, if it is alternatively determined that a current state of the package stack references the non-empty state (described above), then the process may alternatively proceed to Step 314.

In Step 312, after determining (in Step 310) that the PSS (obtained in Step 308) reflects that the current state of the package stack references an empty state, the new HRP (received in Step 300) is installed on the repurposable host. Installation of any given HRP (e.g., the new HRP) is described in further detail below with respect to FIG. 4. Following the installation of the new HRP, the process ends.

In Step 314, after alternatively determining (in Step 310) that the PSS (obtained in Step 308) reflects that the current state of the package stack references a non-empty state, a latest HRP installed on the repurposable host is uninstalled therefrom. Uninstallation of any given HRP (e.g., the latest HRP) is described in further detail below with respect to FIG. 5. Following the uninstallation of the latest HRP installed on the repurposable host, the process may proceed to Step 308, where a new PSS may be obtained. The new PSS may reflect a new state of the package stack following the uninstallation of the aforementioned latest HRP, which may translate to the removal of the latest (or topmost) HRP from the package stack.

Turning to FIG. 3B, in Step 320, after determining (in Step 306) that the base flag (examined in Step 304) reflects that the new HRP (received in Step 300) is an overlay HRP, a latest HRP installed on the repurposable host is identified. In one embodiment of the invention, identification of the aforementioned latest HRP may entail examining the package stack (see e.g., FIG. 1B) and identifying the topmost HRP stored in the package stack.

In Step 322, the latest HRP (identified in Step 320) is decompressed. In one embodiment of the invention, any HRP (including the latest HRP) may take form as an archive and/or compressed file format, which may enclose some content. Through decompression of the latest HRP, the exposed content, which may be obtained, may include a latest package manifest and a latest configuration profile. Both of these items are described in detail above with respect to FIG. 2A.

In Step 324, an overlay whitelist specified in the latest package manifest (obtained in Step 322) is examined. In one embodiment of the invention, the overlay whitelist may represent a list of overlay HRP permissions. Specifically, the overlay whitelist may specify zero or more package IDs representative of other HRPs, which may be installed over the latest HRP.

In Step 326, a determination is made as to whether the overlay whitelist (examined in Step 324) is representative of an empty set. In one embodiment of the invention, if it is determined that the overlay whitelist for the latest HRP (identified in Step 320) is effectively an empty set, then the process may proceed to Step 328. On the other hand, in another embodiment of the invention, if it is alternatively determined that the overlay whitelist for the latest HRP specifies at least one package ID, then the process may alternatively proceed to Step 330.

In Step 328, after determining (in Step 326) that the overlay whitelist (examined in Step 324) for the latest HRP (identified in Step 320) is empty, an error message is issued. In one embodiment of the invention, an empty overlay whitelist may reflect that the latest HRP disallows any other HRPs (e.g., the new HRP (received in Step 300)) to be installed (or overlaid) on top of the latest HRP. Accordingly, an error message indicating this installation restriction may be issued. Following the issuance of the error message, the process ends.

In Step 330, after alternatively determining (in Step 326) that the overlay whitelist (examined in Step 324) for the latest HRP (identified in Step 320) is not empty, thereby disclosing at least one package ID, a package ID (i.e., a new package ID) specified in the new package manifest (obtained in Step 302) is examined. In one embodiment of the invention, a package ID may refer to a string of characters (e.g., letters, numbers, symbols, or any combination thereof) that may uniquely identify a respective HRP. Accordingly, the new package ID may refer to a string of characters that uniquely identify the new HRP (received in Step 300).

In Step 332, a determination is made as to whether the new package ID (examined in Step 330) is listed in the overlay whitelist for the latest HRP (obtained in Step 322). In one embodiment of the invention, if it is determined that the new package ID matches one of the one or more package IDs specified in the overlay whitelist, then the process may proceed to Step 334. On the other hand, if it is alternatively determined that the new package ID does not match any of the one or more package IDs specified in the overlay whitelist, then the process may alternatively proceed to Step 328. Following this latter determination, an error message may be issued, which may indicate that the new HRP (received in Step 300) is not amongst a list of allowed HRPs that may be installed (or overlaid) on top of the latest HRP.

In Step 334, after determining (in Step 332) that the new package ID (examined in Step 330) matches one of the one or more package IDs specified in the overlay whitelist (examined in Step 324) for the latest HRP (identified in Step 320), the new HRP (received in Step 300) is installed on the repurposable host. Installation of any given HRP (e.g., the new HRP) is described in further detail below with respect to FIG. 4. Following the installation of the new HRP, the process ends.

Figure 4:
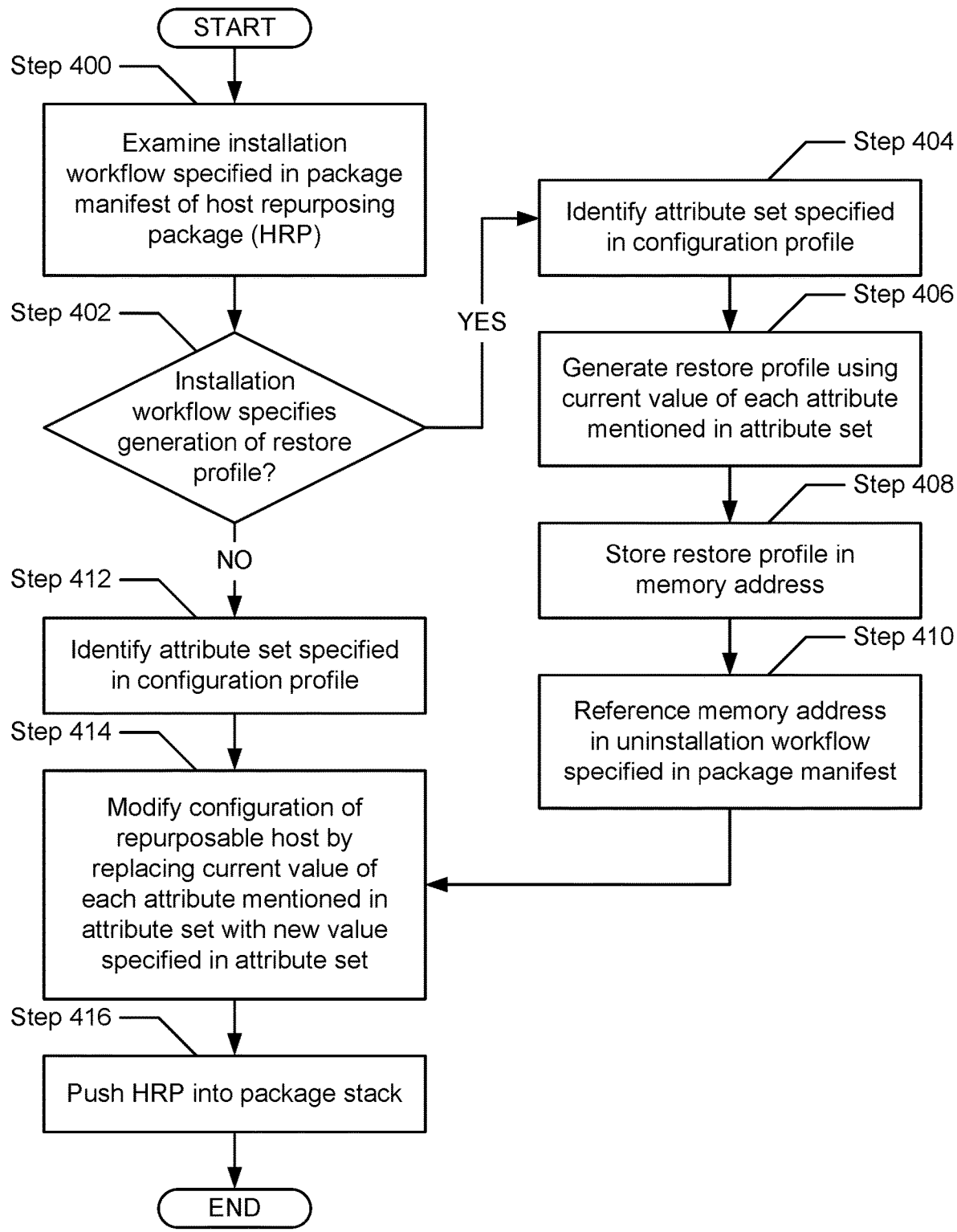
FIG. 4 shows a flowchart describing a method for installing a host repurposing package in accordance with one or more embodiments of the invention.

FIG. 4 shows a flowchart describing a method for installing a host repurposing package (HRP) in accordance with one or more embodiments of the invention. The various steps outlined below may be performed by the package registrar of the host repurposing controller (HRC) on the repurposable host (see e.g., FIGS. 1A and 1B). Further, while the various steps in the flowchart are presented and described sequentially, one of ordinary skill will appreciate that some or all steps may be executed in different orders, may be combined or omitted, and some or all steps may be executed in parallel.

Turning to FIG. 4, in Step 400, an installation workflow specified in a package manifest, of the HRP to-be-installed, is examined. In one embodiment of the invention, the installation workflow may refer to a sequence of properties, which collectively outline the process for installing the HRP to-be-installed on a repurposable host. Specifically, the installation workflow may identify one or more tuples in a sequenced order, where each tuple may include an installation-pertinent parameter and a corresponding parameter value associated with the installation-pertinent parameter. The package registrar may interpret these one or more sequenced tuple(s) to properly install the HRP to-be-installed.

In Step 402, a determination is made as to whether the installation workflow (examined in Step 400) specifies a tuple directed to the generation of a restore profile. A restore profile may refer to an outline of system (e.g., basic input-output system (BIOS)) configuration changes, which when applied, reverts a repurposable host to a previous state that may have optimized the repurposable host for a previously installed infrastructure and/or workload deployment. The restore profile may resemble a configuration profile (see e.g., FIG. 2A) in structure and, accordingly, may specify an attribute set including one or more system configuration settings (or attributes), where each system configuration attribute may be further defined through an attribute identifier (ID), an attribute value, and an attribute mode. Subsequently, in one embodiment of the invention, if it is determined that the installation workflow specifies the generation of a restore profile, then the process may proceed to Step 404. On the other hand, if it is alternatively determined that the installation workflow does not specify the generation of a restore profile, then the process may alternatively proceed to Step 412.

In Step 404, after determining (in Step 402) that the installation workflow (examined in Step 400) specifies a tuple directed to the generation of a restore profile, an attribute set specified in a configuration profile, of the HRP to-be-installed, is identified. In one embodiment of the invention, the aforementioned attribute set may refer to a collection of one or more system configuration settings (or attributes), which may be pertinent to (and have been adjusted for) the implementation of the particular infrastructure and/or workload deployment with which the HRP to-be-installed may be associated.

In Step 406, the restore profile is generated based on the attribute set (identified in Step 404). Specifically, in one embodiment of the invention, generation of the restore profile may entail at least the following tasks: (a) creation of a new package registrar interpretable script; (b) replication, and migration, of the attribute set specified in the configuration profile into the new script; and for each attribute identified in the attribute set: (c) obtaining a current (or existing) attribute value, associated with the attribute ID, exhibited in the current on-host system (e.g., BIOS) configuration settings of the repurposable host; and (d) replacing the attribute value, specified for the attribute in the replicated attribute set in the new script, with the current (or existing) attribute value obtained in (c). Accordingly, the restore profile may preserve the attribute values, respective to the latest (or last) installed HRP—i.e., not the HRP to-be-installed—on the repurposable host, for the attribute set pertinent to the installation of the HRP to-be-installed.

By way of an example, the configuration profile may specify an attribute set that includes: (a) a first attribute referenced by a first attribute name—e.g., "LogicalProc"—and associated with a new first attribute value—e.g., "disabled"; and (b) a second attribute referenced by a second attribute name—e.g., "WriteCache"—and associated with a new second attribute value—e.g., "enabled". The current on-host system configuration, on the other hand, may specify various attributes, including the "LogicalProc" and "WriteCache" attributes, which may be associated with current attribute values "enabled" and "disabled", respectively. The restore profile may initially reflect the same information disclosed in the configuration profile; however, the new first and second attribute values are subsequently changed to reflect the current attribute values, respective to the "LogicalProc" and "WriteCache" attributes, specified in the current on-host system configuration. That is, following generation, the restore profile may specify the "LocalProc" attribute and the associated current attribute value "enabled" (in place of the new attribute value "disabled" specified in the configuration profile); and the "WriteCache" attribute and the associated current attribute value "disabled" (in place of the new attribute value "enabled" specified in the configuration profile).

In Step 408, the restore profile (generated in Step 406) is subsequently stored (or saved) in a designated memory address of on-host memory. Following the storage of the restore profile, in Step 410, an uninstallation workflow (see e.g., FIG. 2A), specified in the package manifest of the HRP to-be-installed, is updated to include a reference to the aforementioned memory address wherein the restore profile had been stored. In one embodiment of the invention, the reference may be implemented using a pointer (i.e., a data object or variable whose value reflects the memory address or references a location in the on-host memory with which the memory address is associated). Hereinafter, the process proceeds to Step 414 (described below).

In Step 412, after alternatively determining (in Step 402) that the installation workflow (examined in Step 400) does not specify a tuple directed to generating a restore profile, an attribute set, specified in a configuration profile of the HRP to-be-installed, is identified. In one embodiment of the invention, the aforementioned attribute set may refer to a collection of one or more system configuration settings (or attributes), which may be pertinent to (and have been adjusted for) the implementation of the particular infrastructure and/or workload deployment with which the HRP to-be-installed may be associated.

In Step 414, following the identification of the attribute set (in Step 412) or the update to the uninstallation workflow (in Step 410), a current on-host system (e.g., BIOS) configuration of the repurposable host is modified. In one embodiment of the invention, the current on-host system configuration may be adjusted to reflect a new on-host system configuration, based on the attribute set specified in the configuration profile of the HRP to-be-installed, which optimizes the repurposable host for the particular infrastructure and/or workload deployment that which the HRP to-be-installed implements. Specifically, adjustment of the current on-host system configuration, to reflect the new on-host system configuration, may entail at least the following tasks: (a) identification and access to the current on-host system (e.g., BIOS) configuration; and for each attribute identified in the attribute set of the aforementioned HRP to-be-installed configuration profile: (b) identification of a similar attribute, specified in the current on-host system configuration, associated with an attribute ID matching the attribute ID of the configuration profile attribute; and (c) replacement of the current (or existing) attribute value, specified in the current on-host system configuration, pertaining to the aforementioned similar attribute, with the new attribute value indicated in the configuration profile for the respective configuration profile attribute.

For example, the configuration profile may specify an attribute set that includes: (a) a first attribute referenced by a first attribute name—e.g., "LogicalProc"—and associated with a new first attribute value—e.g., "disabled"; and (b) a second attribute referenced by a second attribute name—e.g., "WriteCache"—and associated with a new second attribute value—e.g., "enabled". The current on-host system configuration, on the other hand, may specify various attributes, including the "LogicalProc" and "WriteCache" attributes, which may be associated with current attribute values "enabled" and "disabled", respectively. Adjustment of the current on-host system configuration, therefore, may entail the replacement of the respective current attribute value for the "LogicalProc" and "WriteCache" attributes (in the current on-host system configuration) with the respective new attribute value for the aforementioned attributes (disclosed in the configuration profile)—i.e., "LocalProc" current value "enabled" replaced with new value "disabled", and "Write-Cache" current value "disabled" replaced with new value "enabled".

In Step 416, the HRP (associated with the installation workflow examined in Step 400) is pushed into or stored in the package stack (see e.g., FIG. 1B). In one embodiment of the invention, the package stack may represent an in-memory data structure used to track a sequential collection of HRPs, which have been installed on the repurposable host. Subsequently, pushing or storing a given HRP in the package stack affirms that the installation process is complete, and accordingly, the repurposable host exhibits a new on-host system configuration which optimizes the repurposable host for the infrastructure and/or workload deployment implemented through the changes introduced by the HRP.

Figure 5:
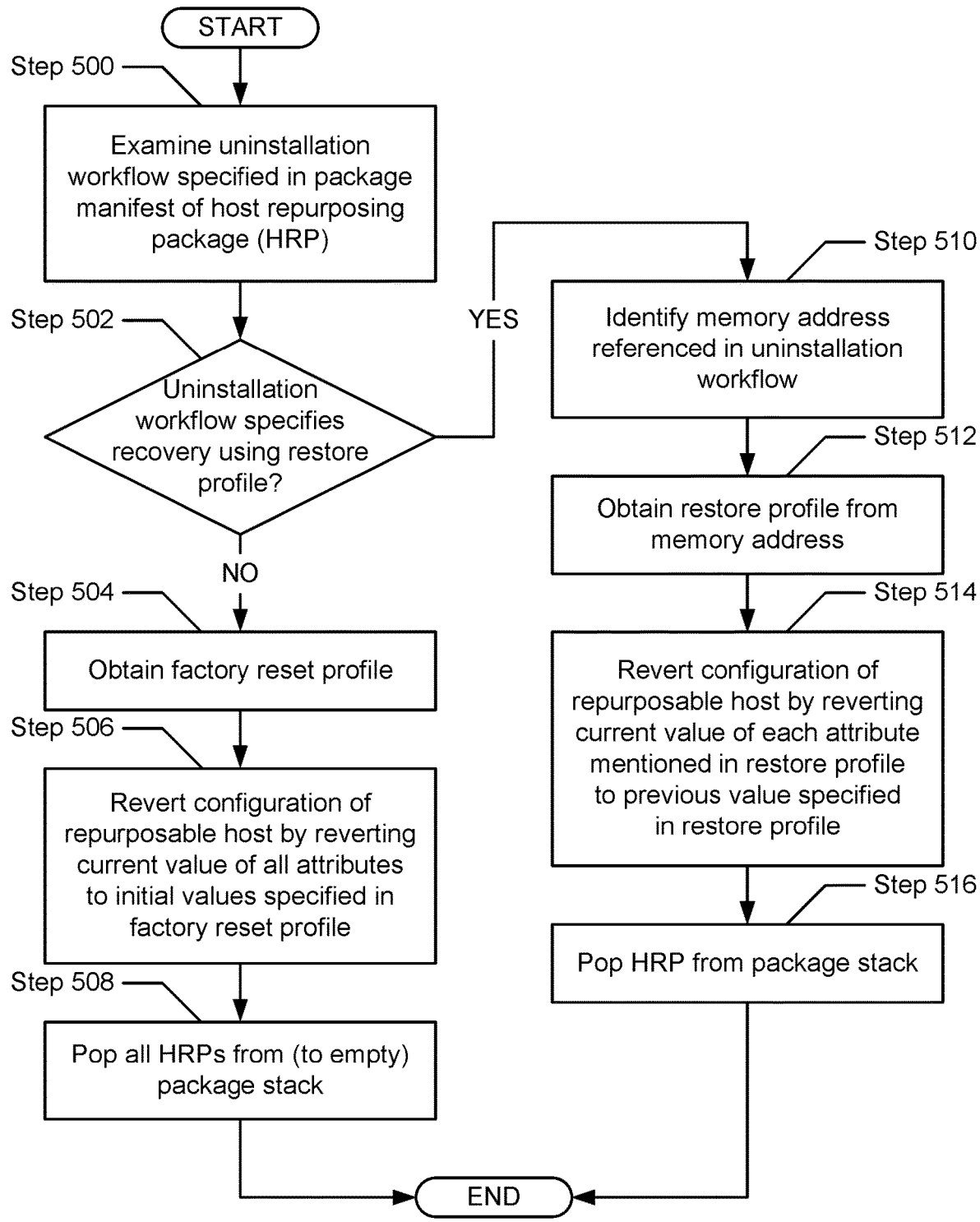
FIG. 5 shows a flowchart describing a method for uninstalling a host repurposing package in accordance with one or more embodiments of the invention.

FIG. 5 shows a flowchart describing a method for uninstalling a host repurposing package (HRP) in accordance with one or more embodiments of the invention. The various steps outlined below may be performed by the package registrar of the host repurposing controller (HRC) on the repurposable host (see e.g., FIGS. 1A and 1B). Further, while the various steps in the flowchart are presented and described sequentially, one of ordinary skill will appreciate that some or all steps may be executed in different orders, may be combined or omitted, and some or all steps may be executed in parallel.

Turning to FIG. 5, in Step 500, an uninstallation workflow specified in a package manifest, of the HRP to-be-uninstalled, is examined. In one embodiment of the invention, the uninstallation workflow may refer to a sequence of properties, which collectively outline the process for uninstalling the HRP to-be-uninstalled from a repurposable host. Specifically, the uninstallation workflow may identify one or more tuples in a sequenced order, where each tuple may include an uninstallation-pertinent parameter and a corresponding parameter value associated with the uninstallation-pertinent parameter. The package registrar may interpret these one or more sequenced tuple(s) to properly uninstall the HRP to-be-uninstalled.

In Step 502, a determination is made as to whether the uninstallation workflow (examined in Step 500) specifies a tuple directed to a system configuration recovery using a restore profile. A restore profile may refer to an outline of system (e.g., basic input-output system (BIOS)) configuration changes, which when applied, reverts a repurposable host to a previous state that may have optimized the repurposable host for a previously installed infrastructure and/or workload deployment. The restore profile may resemble a configuration profile (see e.g., FIG. 2A) in structure and, accordingly, may specify an attribute set including one or more system configuration settings (or attributes), where each system configuration attribute may be further defined through an attribute identifier (ID), an attribute value, and an attribute mode. Subsequently, in one embodiment of the invention, if it is determined that the uninstallation workflow specifies the system configuration recovery, then the process may proceed to Step 510. On the other hand, if it is alternatively determined that the uninstallation workflow does not specify the system configuration recovery, then the process may alternatively proceed to Step 504.

In Step 504, after determining (in Step 502) that the uninstallation workflow (examined in Step 500) does not specify a tuple directed to a system configuration recovery, a factory reset profile is obtained. In one embodiment of the invention, the factory reset profile may refer to an outline of initial (or default) system (e.g., BIOS) configuration settings with which the repurposable host had originally been provisioned. That is, the factor reset profile may at least specify factory-provisioned attribute values for all on-host system configuration attributes, which characterize the repurposable host.

In Step 506, a current on-host system (e.g., BIOS) configuration of the repurposable host is reverted to its factory-provisioned state. That is, in one embodiment of the invention, the current on-host system configuration may be adjusted to reflect the default on-host system configuration, based on the attribute values specified in the factory reset profile (obtained in Step 504). Specifically, adjustment of the current on-host system configuration, to reflect the default on-host system configuration, may entail at least the following tasks: (a) identification and access to the current on-host system (e.g., BIOS) configuration; and for each attribute identified current on-host system configuration: (b) replacement of the current (or existing) attribute value, specified in the current on-host system configuration, pertaining to the system configuration attribute, with the initial (or default) attribute value indicated in the factory reset profile for the respective system configuration attribute.

For example, and for simplification, assume the current on-host system configuration specifies an attribute set that includes: (a) a first attribute referenced by a first attribute name—e.g., "LogicalProc"—and associated with a current first attribute value—e.g., "disabled"; and (b) a second attribute referenced by a second attribute name—e.g., "WriteCache"—and associated with a current second attribute value—e.g., "enabled". The factory reset profile, on the other hand, may specify an attribute set that includes the "LogicalProc" and "WriteCache" attributes; however, it associates them with initial (or default) attribute values "enabled" and "disabled", respectively. Adjustment of the current on-host system configuration, therefore, may entail the replacement of the respective current attribute value for the "LogicalProc" and "WriteCache" attributes (in the current on-host system configuration) with the respective default attribute value for the aforementioned attributes (disclosed in the factory reset profile)—i.e., "LocalProc" current value "disabled" replaced with default value "enabled", and "WriteCache" current value "enabled" replaced with default value "disabled".

In Step 508, following the reversion of the current on-host system configuration to a factory-provisioned state (in Step 506), any and all HRPs (including the HRP to-be-uninstalled) stored in the package stack are popped or removed therefrom. In one embodiment of the invention, the package stack may represent an in-memory data structure used to track a sequential collection of HRPs, which have been installed on the repurposable host. Furthermore, the popping or removal of any and all HRPs in the package stack may translate to emptying the package stack—i.e., reflective of the repurposable host exhibiting the aforementioned factory-provisioned state. Hereinafter, the process ends.

In Step 510, after alternatively determining (in Step 502) that the uninstallation workflow (examined in Step 500) specifies a tuple directed to a system configuration recovery using a restore profile, a memory address reference specified in the uninstallation workflow is identified. In one embodiment of the invention, the memory address reference may take form as a pointer (i.e., a data object or variable whose value reflects a memory address or references a location in the on-host memory with which the memory address is associated). Thereafter, in Step 512, the restore profile—pertinent to the uninstallation of the HRP to-be-uninstalled—is obtained from a memory address in on-host memory using the memory address reference (identified in Step 510).

In Step 514, a current on-host system (e.g., BIOS) configuration of the repurposable host is reverted to a previous state, which may have characterized the repurposable host prior to the installation of the HRP to-be-uninstalled. That is, in one embodiment of the invention, the current on-host system configuration may be adjusted to reflect the previous on-host system configuration, based on the attribute set specified in the restore profile (obtained in Step 512), which optimizes the repurposable host for the particular infrastructure and/or workload deployment that which a previous HRP, installed prior to the HRP to-be-uninstalled, implements. Specifically, adjustment of the current on-host system configuration, to reflect the previous on-host system configuration, may entail at least the following tasks: (a) identification and access to the current on-host system (e.g., BIOS) configuration; and for each attribute identified in the attribute set of the HRP to-be-uninstalled restore profile: (b) identification of a similar attribute, specified in the current on-host system configuration, associated with an attribute ID matching the attribute ID of the restore profile attribute; and (c) replacement of the current (or existing) attribute value, specified in the current on-host system configuration, pertaining to the aforementioned similar attribute, with the previous (or stored) attribute value indicated in the restore profile for the respective restore profile attribute.

For example, the restore profile may specify an attribute set that includes: (a) a first attribute referenced by a first attribute name—e.g., "LogicalProc"—and associated with a previous first attribute value—e.g., "disabled"; and (b) a second attribute referenced by a second attribute name—e.g., "WriteCache"—and associated with a previous second attribute value—e.g., "enabled". The current on-host system configuration, on the other hand, may specify various attributes, including the "LogicalProc" and "WriteCache" attributes, which may be associated with current attribute values "enabled" and "disabled", respectively. Adjustment of the current on-host system configuration, therefore, may entail the replacement of the respective current attribute value for the "LogicalProc" and "WriteCache" attributes (in the current on-host system configuration) with the respective previous attribute value for the aforementioned attributes (disclosed in the restore profile)—i.e., "LocalProc" current value "enabled" replaced with previous value "disabled", and "WriteCache" current value "disabled" replaced with previous value "enabled".

In Step 516, the HRP (associated with the uninstallation workflow examined in Step 500) is popped or removed from the package stack (see e.g., FIG. 1B). In one embodiment of the invention, the package stack may represent an in-memory data structure used to track a sequential collection of HRPs, which have been installed on the repurposable host. Subsequently, popping or removing a given HRP from the package stack affirms that the uninstallation process is complete, and accordingly, the repurposable host reverts to a previous on-host system configuration which optimizes the repurposable host for a previous infrastructure and/or workload deployment.

Figure 6:
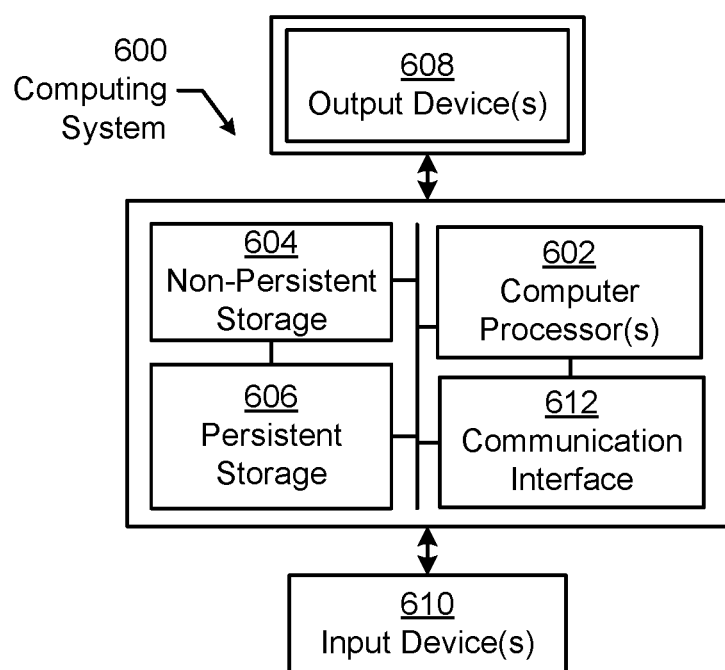
FIG. 6 shows a computing system in accordance with one or more embodiments of the invention.

FIG. 6 shows a computing system in accordance with one or more embodiments of the invention. The computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device. Further, the communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

In one embodiment of the invention, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for repurposing a host, using a package registrar executing on a processing system equipped with a processor and memory-stored instructions thereon, which when executed by the processor, cause the processor to execute the method, comprising:

receiving a first host repurposing package (HRP) comprising a first package manifest;

examining a first base flag specified in the first package manifest; making a first determination that the first base flag is disabled;

identifying, based on the first determination, a second HRP stored in a package stack, wherein the second HRP comprises a second package manifest;

examining a first overlay whitelist specified in the second package manifest;

making a second determination that the first overlay whitelist comprises a first package identifier (ID) associated with the first HRP; and installing, based on the second determination, the first HRP to repurpose the host.

2. The method of claim 1, wherein the second HRP is a latest HRP installed prior to receipt of the first HRP.

3. The method of claim 1, further comprising:
decompressing the first HRP to obtain the first package manifest and a first configuration profile.

4. The method of claim 3, wherein installing the first HRP comprises:
examining the first configuration profile, to identify an attribute set comprising at least one attribute;
for each attribute of the attribute set:
replacing a current value for the attribute, specified on the host, with a new value for the attribute, specified in the first configuration profile; and
storing the first HRP in the package stack.

5. The method of claim 4, wherein installing the first HRP further comprises:
after identifying the attribute set, and for each attribute of the attribute set:
storing the current value for the attribute, specified on the host, in a restore profile; and
referencing the restore profile within an uninstallation workflow specified in the first package manifest.

6. The method of claim 1, further comprising:
receiving a third HRP comprising a third package manifest, wherein a second base flag is specified in the third package manifest;
examining the second base flag specified in the third package manifest;
making a third determination that the second base flag is disabled;
identifying, based on the third determination, the first HRP stored in the package stack;
decompressing the first HRP, to obtain the first package manifest;
examining a second overlay whitelist specified in the first package manifest;
making a fourth determination that the second overlay whitelist comprises a second package ID associated with the third HRP; and
installing, based on the fourth determination, the third HRP to repurpose the host.

7. The method of claim 1, further comprising:
receiving a third HRP comprising a third package manifest, wherein a second base flag is specified in the third package manifest;
examining a second base flag specified in the third package manifest;
making a third determination that the second base flag is enabled;
uninstalling, based on the third determination, each HRP stored in the package stack until the package stack is empty; and
after the package stack is empty:
installing the third HRP to repurpose the host.

8. The method of claim 7, wherein uninstalling each HRP stored in the package stack comprises:
for each HRP stored in the package stack from a most recently installed to a least recently installed:
decompressing the HRP, to obtain a fourth package manifest;

examining an uninstallation workflow specified in the fourth package manifest, to identify a restore profile reference;
obtaining a restore profile for the HRP using the restore profile reference;
identifying, within the restore profile, an attribute set comprising at least one attribute;
for each attribute of the attribute set:
reverting a current value for the attribute, specified on the host, to a previous value for the attribute, specified in the restore profile; and
removing the HRP from the package stack.

9. A system, comprising:
a host comprising a computer processor; and
a package registrar executing on the computer processor, and programmed to:
receive a first host repurposing package (HRP) comprising a first package manifest;
examine a first base flag specified in the first package manifest;
make a first determination that the first base flag is disabled;
identify, based on the first determination, a second HRP stored in a package stack, wherein the second HRP comprises a second package manifest;
examine a first overlay whitelist specified in the second package manifest;
make a second determination that the first overlay whitelist comprises a first package identifier (ID) associated with the first HRP; and
install, based on the second determination, the first HRP to repurpose the host.

10. The system of claim 9, wherein the host further comprises a host repurposing controller (HRC) executing on the computer processor, wherein the HRC comprises the package registrar and the package stack.

11. The system of claim 9, further comprising:
a host repurposing service (HRS) operatively connected to the host,
wherein the package registrar receives the first HRP from the HRS.

12. The system of claim 9, wherein the host is a bare-metal server.

13. A non-transitory computer readable medium (CRM) comprising computer readable program code, which when executed by a computer processor, enables the computer processor to:
receive a first host repurposing package (HRP);
decompress the first HRP, to obtain a first package manifest;
examine a first base flag specified in the first package manifest;
make a first determination that the first base flag is disabled;
identify, based on the first determination, a second HRP stored in a package stack;
decompress the second HRP, to obtain a second package manifest;
examine a first overlay whitelist specified in the second package manifest;
make a second determination that the first overlay whitelist comprises a first package identifier (ID) associated with the first HRP; and
install, based on the second determination, the first HRP to repurpose a host.

14. The non-transitory CRM of claim 13, wherein the second HRP is a latest HRP installed prior to receipt of the first HRP.

15. The non-transitory CRM of claim 13, wherein decompressing the first HRP further obtains a first configuration profile.

16. The non-transitory CRM of claim 15, wherein to install the first HRP, the computer readable program code enables the computer processor to:
 examine the first configuration profile, to identify an attribute set comprising at least one attribute;
 for each attribute of the attribute set:
  replace a current value for the attribute, specified on the host, with a new value for the attribute, specified in the first configuration profile; and
 store the first HRP in the package stack.

17. The non-transitory CRM of claim 16, wherein to install the first HRP, the computer readable program code further enables the computer processor to:
 after identifying the attribute set, and for each attribute of the attribute set:
  store the current value for the attribute, specified on the host, in a restore profile; and
 reference the restore profile within an uninstallation workflow specified in the first package manifest.

18. The non-transitory CRM of claim 13, further comprising computer readable program code, which when executed by the computer processor, enables the computer processor to:
 receive a third HRP;
 decompress the third HRP, to obtain a third package manifest;
 examine a second base flag specified in the third package manifest;
 make a third determination that the second base flag is disabled;
 identify, based on the third determination, the first HRP stored in the package stack;
 decompress the first HRP, to obtain the first package manifest;
 examine a second overlay whitelist specified in the first package manifest;
 make a fourth determination that the second overlay whitelist comprises a second package ID associated with the third HRP; and
 install, based on the fourth determination, the third HRP to repurpose the host.

19. The non-transitory CRM of claim 13, further comprising computer readable program code, which when executed by the computer processor, enables the computer processor to:
 receive a third HRP;
 decompress the third HRP, to obtain a third package manifest;
 examine a second base flag specified in the third package manifest;
 make a third determination that the second base flag is enabled;
 uninstall, based on the third determination, each HRP stored in the package stack until the package stack is empty; and
 after the package stack is empty:
  install the third HRP to repurpose the host.

20. The non-transitory CRM of claim 19, wherein to uninstall each HRP stored in the package stack, the computer readable program code enables the computer processor to:
 for each HRP stored in the package stack from a most recently installed to a least recently installed:
  decompress the HRP, to obtain a fourth package manifest;
  examine an uninstallation workflow specified in the fourth package manifest, to identify a restore profile reference;
  obtain a restore profile for the HRP using the restore profile reference;
  identify, within the restore profile, an attribute set comprising at least one attribute;
  for each attribute of the attribute set:
   revert a current value for the attribute, specified on the host, to a previous value for the attribute, specified in the restore profile; and
  remove the HRP from the package stack.

* * * * *